(12) United States Patent
Yip et al.

(10) Patent No.: US 6,714,210 B1
(45) Date of Patent: Mar. 30, 2004

(54) CONTINUOUS KERNEL IMAGE INTERPOLATION

(75) Inventors: Dominic Yip, Lindfield (AU); Andrew Peter Bradley, Castlecrag (AU); Kai Huang, Cecil Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,177

(22) Filed: Dec. 17, 1999

(30) Foreign Application Priority Data

Dec. 18, 1998 (AU) .............................................. PP7799

(51) Int. Cl.$^7$ ......................... G06T 3/40; G09G 5/391
(52) U.S. Cl. ................................... 345/667; 345/698
(58) Field of Search .................................. 345/667, 698; 382/299, 300; 358/1.2, 525, 528, 451

(56) References Cited

U.S. PATENT DOCUMENTS 5,949,915 A * 9/1999 Yamada ...................... 382/300
6,259,427 B1 * 7/2001 Martin et al. ............... 345/698
6,263,120 B1 * 7/2001 Matsuoka .................... 382/300

FOREIGN PATENT DOCUMENTS

| EP | 0 908 845 A1 | 4/1999 |
| WO | WO 90/16035 | 12/1990 |
| WO | WO 96/16380 | 5/1996 |

* cited by examiner

Primary Examiner—Jeffery Brier
(74) Attorney, Agent, or Firm—Fitzpatrick, Cella, Harper & Scinto

(57) ABSTRACT

A method of resolution conversion is disclosed. The method calculates a scaling factor for a first set of discrete data values compared to said second set of discrete data values. A plurality of filter function coefficients are calculated, based on the scaling factor, utilising at least one of a plurality of filter functions. The filter function coefficients are stored and later used to perform interpolation on the first set of discrete data values to generate the second set of discrete data values at a different resolution.

71 Claims, 11 Drawing Sheets

Fig. 3

| x index | offset |
|---|---|

Fig. 6a

| y index | offset |
|---|---|

Fig. 6b

CONTINUOUS KERNEL IMAGE INTERPOLATION

FIELD OF INVENTION

The present invention relates to the field of resolution conversions of digital data and in particular digital image data. The current invention is particularly advantageous for a resolution conversion implementation that uses samples from a continuous kernel as coefficients in the convolution operation. The current invention also provides an efficient software algorithm to implement resolution conversion.

BACKGROUND OF INVENTION

A filter function used in digital data resolution conversion is often called a convolution kernel, a filter kernel or just a kernel. When a kernel produces data that passes through original data points of a sampled signal, it is often called an interpolating kernel and when the interpolated data produced is not constrained to pass through the original data points it is often called an approximating kernel.

Prior art kernels for digital data resolution conversion include the nearest neighbour (NN), linear, quadratic and cubic kernels. The NN kernel is the simplest method of interpolation, simply interpolating the image with the pixel value that is spatially nearest to the required pixel value. This method works quite well when the scaling ratio is an integer multiple of the original data as it introduces no new values, ie. no new colours, and preserves sharp edges. However, at other ratios the NN kernel has the disadvantage of shifting edge locations which often produces visible distortions in the output image, especially in images containing text or fine line details. Linear interpolation on the other hand allows for the introduction of new grey levels (or colours) that are effectively used to position edges at sub-pixel locations. This has the advantage of reducing the effect of shifted edge locations, however sharp edges can now appear to be blurred. Quadratic and cubic interpolation provide steeper step responses and therefore less edge blurring, however, the steeper response results in an overshoot on either side of the edge. These overshoots can make the edges in natural images appear sharper, but on text, fine lines, or on other computer generated graphics these overshoots are clearly visible and detract from the perceived image quality and text legibility.

Hardware to perform two dimensional image interpolation using a method of cubic convolution is known whereby pre-calculated values of the two-dimensional cubic convolution kernel are stored in a look-up table (LUT) and then simultaneously 16 (4×4) coefficient values are read and multiplied with 16 pixels in the original image surrounding the pixel location to be interpolated. Storing the coefficient values in a look-up table removes the need to calculate the coefficients at each interpolated pixel and therefore increases the speed of execution of the algorithm.

Another technique performs two-dimensional interpolation by first interpolating the rows of an image and then interpolating the columns of the image. Up to 4 coefficients for each of the one-dimensional convolution kernels are again read from a LUT, multiplied with data, and summed to produce an interpolated pixel. However, this implementation, which is commonly referred to as a "separable implementation", is not as fast as the two-dimensional implementation discussed above, although significant reductions in the memory requirements of the LUT may be obtained.

There is a problem however, with both of these known methods in that pre-calculating values and storing them in a LUT introduces an error between the actual coefficient value required for the interpolation and the closest value stored in the LUT. Storing more values in the LUT can reduce this error, however, this can drastically increase the amount of storage required for the LUT.

It is an object of the present invention to ameliorate one or more disadvantages of the prior art.

SUMMARY OF THE INVENTION

One or more exemplary aspects of the invention are listed below, but are not limited thereto.

According to one aspect of the invention there is provided a method of converting a first set of discrete data values to a second set of discrete data values, the method comprising the following steps:
  (i) calculating a scaling factor of said first set of discrete data values compared to said second set of discrete data values;
  (ii) calculating a plurality of filter function coefficients, based on said scaling factor, utilising at least one of a plurality of filter functions;
  (iii) storing said filter function coefficients;
  (iv) accessing said stored filter function coefficients; and
  (v) performing interpolation on said first set of discrete data values, using said accessed filter function coefficients, to generate said second set of discrete data values.

According to another aspect of the invention there is provided an apparatus for converting a first set of discrete data values to a second set of discrete data values, the apparatus comprising:
  calculator means for calculating a scaling factor of said first set of discrete data values compared to said second set of discrete data values, and calculating a plurality of filter function coefficients, based on said scaling factor, utilising at least one of a plurality of filter functions;
  storage means for storing said filter function coefficients;
  storage access means for accessing said stored filter function coefficients; and
  interpolation means for performing interpolation on said first set of discrete data values, using said accessed filter function coefficients, to generate said second set of discrete data values.

According to still another aspect of the invention there is provided a computer readable medium for storing a program for an apparatus which processes data, said processing comprising a method of converting a first set of discrete data values to a second set of discrete data values, said program comprising:
  code for calculating a scaling factor of said first set of discrete data values compared to said second set of discrete data values;
  code for calculating a plurality of filter function coefficients, based on said scaling factor, utilising at least one of a plurality of filter function;
  code for storing said filter function coefficients;
  code for accessing said stored filter function coefficients; and
  code for performing interpolation on said first set of discrete data values, using said accessed filter function coefficients, to generate said second set of discrete data values.

According to still another aspect of the invention there is provided a method of performing interpolation on a pixel-based image, the method comprising the steps of:

(i) calculating a scaling factor of a first image compared to a second image;

(ii) calculating a plurality of filter function coefficients, based on said scaling factor, utilising one of a plurality of filter functions;

(iii) storing said filter function coefficients;

(iv) detecting incoming pixels of said first image;

(v) accessing said stored filter function coefficients; and (vi) performing interpolation on said pixels of said first image, using said accessed filter function coefficients, to generate said second image.

According to still another aspect of the invention there is provided an apparatus for performing interpolation on a pixel-based image, the apparatus comprising:

calculator means for calculating a scaling factor of a first image compared to a second image, and calculating a plurality of filter function coefficients, based on said scaling factor, utilising one of a plurality of filter functions;

storage means for storing said filter function coefficients;

detection means for detecting incoming pixels of said first image;

coefficient access means for accessing said stored filter function coefficients; and interpolator for performing interpolation on said pixels of said first image, using said accessed filter function coefficients, to generate said second image.

In embodiments of the invention, the first image may be a colour image.

According to still another aspect of the invention there is provided a computer readable medium for storing a program for an apparatus which processes data, said processing comprising a method of performing interpolation on a pixel-based image, said program comprising:

code for calculating a scaling factor of a first image compared to a second image, and calculating a plurality of filter function coefficients, based on said scaling factor, utilising one of a plurality of filter functions;

code for storing said filter function coefficients;

code for detecting incoming pixels of said first image;

accessing said stored filter function coefficients; and code for performing interpolation on said pixels of said first image, using said accessed filter function coefficients, to generate said second image.

According to still another aspect of the invention there is provided a method of performing interpolation on a pixel-based image, the method comprising the steps of:

(i) inputting dimension values of a first image and a second image:

(ii) calculating a scaling factor of said first image compared to said second image;

(iii) computing interpolation indicators for said second image based on said scaling factor;

(iv) calculating filter function coefficients, according to said interpolation indicators, utilising a filter function, wherein only those filter function coefficients required for said scaling factor are calculated;

(v) storing said filter function coefficients;

(vi) detecting incoming pixels of said first image; and (vii) accessing said stored filter function coefficients; and (viii) performing interpolation on said pixels of said first image, using said accessed filter function coefficients, to generate said second image.

According to still another aspect of the invention there is provided an apparatus for performing interpolation on a pixel-based image, said apparatus comprising:

input means for inputting dimension values of a first image and a second image:

calculator means for calculating a scaling factor of said first image compared to said second image, computing interpolation indicators for said second image based on said scaling factor, and calculating filter function coefficients, according to said interpolation indicators, utilising a filter function, wherein only those filter function coefficients required for said scaling factor are calculated;

storage means for storing said filter function coefficients;

detection means for detecting incoming pixels of said first image; and coefficient access means for accessing said stored filter function coefficients; and interpolator for performing interpolation on said pixels of said first image, using said accessed filter function coefficients, to generate said second image.

According to still another aspect of the invention there is provided a computer readable medium for storing a program for an apparatus which processes data, said processing comprising a method of performing interpolation on a pixel-based image, said program comprising:

code for inputting dimension values of a first image and a second image:

code for calculating a scaling factor of said first image compared to said second image;

code for computing interpolation indicators for said second image based on said scaling factor;

code for calculating filter function coefficients, according to said interpolation indicators, utilising a filter function, wherein only those filter function coefficients required for said scaling factor are calculated;

code for storing said filter function coefficients;

code for detecting incoming pixels of said first image; and code for accessing said stored filter function coefficients; and code for performing interpolation on said pixels of said first image, using said accessed filter function coefficients, to generate said second image.

According to still another aspect of the invention there is provided a method of performing image interpolation, the method comprising the steps:

(i) inputting dimension values of a first image and a second image;

(ii) calculating a first sampling increment value, a second sampling increment value, a first sampling limit value and a second sampling limit value, for said first image, using said dimension values;

(iii) computing pairs of interpolation indicators according to said first and second sampling limit values;

(iv) calculating fractional first and second coordinate values using said interpolation indicators;

(v) calculating filter function coefficient values, based on said first and second fractional coordinate values, utilising a filter function;

(vi) storing said filter function coefficient values in a table;

(vii) detecting input pixel values of said first image;

(viii) accessing said stored filter function coefficients; and (ix) performing image interpolation on said pixels of said first image using said stored filter function coefficient values to produce said second image.

According to still another aspect of the invention there is provided an apparatus for performing image interpolation, the apparatus comprising:

input means for inputting dimension values of a first image and a second image;

calculator means for calculating a first sampling increment value, a second sampling increment value, a first sampling limit value and a second sampling limit value, for said first image, using said dimension values, computing pairs of interpolation indicators according to said first and second sampling limit values, calculating fractional first and second coordinate values using said interpolation indicators, and calculating filter function coefficient values, based on said first and second fractional coordinate values, utilising a filter function;

storage means for storing said filter function coefficient values in a table;

detection means for detecting input pixel values of said first image;

coefficient access means for accessing said stored filter function coefficients; and interpolator for performing image interpolation on said pixels of said first image using said stored filter function coefficient values to produce said second image.

According to still another aspect of the invention there is provided a computer readable medium for storing a program for an apparatus which processes data, said processing comprising a method of performing image interpolation, said program comprising:

code for inputting dimension values of a first image and a second image;

code for calculating a first sampling increment value, a second sampling increment value, a first sampling limit value and a second sampling limit value, for said first image, using said dimension values;

code for computing pairs of interpolation indicators according to said first and second sampling limit values;

code for calculating fractional first and second coordinate values using said interpolation indicators;

code for calculating filter function coefficient values, based on said first and second fractional coordinate values, utilising a filter function;

code for storing said filter function coefficient values in a table;

detecting input pixel values of said first image;

code for accessing said stored filter function coefficients; and code for performing image interpolation on said pixels of said first image using said stored filter function coefficient values to produce said second image.

According to still another aspect of the invention there is provided a method of performing interpolation on a first pixel-based image, the method comprising the steps of:

(i) determining dimension values for a second image;

(ii) calculating a plurality of filter function coefficients based on said dimension values;

(iii) storing said filter function coefficients;

(iv) detecting incoming pixels of said first image;

(v) accessing said stored filter function coefficients; and (vi) performing interpolation on said pixels of said first image, using said accessed filter function coefficients, to generate said second image.

According to still another aspect of the invention there is provided an apparatus for performing interpolation on a first pixel-based image, the method comprising the steps of:

calculator means for determining means for determining dimension values for a second image and calculating a plurality of filter function coefficients based on said dimension values;

storage means for storing said filter function coefficients;

detection means for detecting incoming pixels of said first image;

coefficient access means for accessing said stored filter function coefficients; and interpolator for performing interpolation on said pixels of said first image, using said accessed filter function coefficients, to generate said second image.

According to still another aspect of the invention there is provided a computer readable medium for storing a program for an apparatus which processes data, said processing comprising a method of performing interpolation on a first pixel-based image, said program comprising:

code for determining dimension values for a second image;

code for calculating a plurality of filter function coefficients based on said dimension values;

code for storing said filter function coefficients;

code for detecting incoming pixels of said first image;

code for accessing said stored filter function coefficients; and code for performing interpolation on said pixels of said first image, using said accessed filter function coefficients, to generate said second image.

BRIEF DESCRIPTION OF THE DRAWINGS

Embodiments of the invention are described with reference to the drawings, in which:

FIG. 6 shows the preferred address format of a coefficient look-up table in accordance with the preferred embodiment;

DETAILED DESCRIPTION

Figure 1:
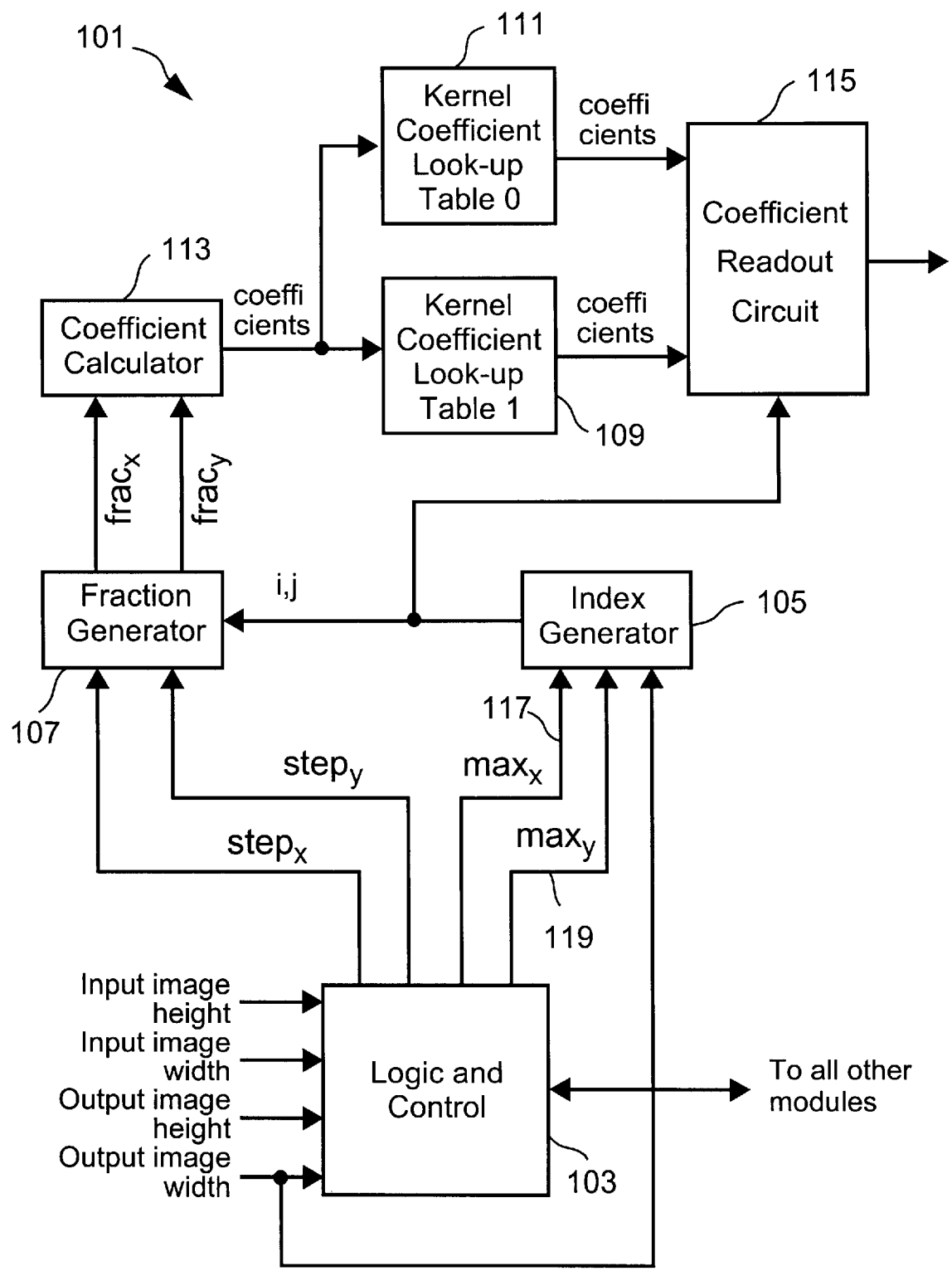
FIG. 1 is a schematic block diagram showing a system for providing kernel coefficients in accordance with a first embodiment of the present invention.

Where reference is made in any one or more of the drawings to steps and/or features, which have the same reference numerals, those steps and/or features are for the purposes of the description have the same functions and or operations, unless the contrary appears.

The preferred embodiment overcomes the problem of having to store multiple pre-calculated convolution values by populating the LUT, before interpolation begins, with only those coefficients required for the particular re-sampling ratio. In this way, there is no error introduced in the coefficient values and the storage required is reduced by recognising the fact that only a limited number of coefficient values are required for any one resolution conversion ratio.

For scaling factors that can be expressed as integer or rational fractions, e.g. 2, 5, 5/8, 8/5, 10/1, the number of coefficients required is limited and these values are repeatedly used along the horizontal and vertical scan lines. The preferred embodiment is a method and apparatus for populating the LUT, before interpolation begins, with only those coefficients required for the particular re-sampling ratio. In this way, both the storage required for the LUT and the error in the stored coefficients are minimised. A second embodiment of the present invention has a further advantage of allowing the LUT to hold a two-dimensional kernel with minimal storage. Using a two-dimensional kernel not only has a speed advantage over the separable implementation, but also allows kernels to be used that cannot be implemented using separable techniques.

Examples of integer or rational scaling factors are the scaling factor between display standards such as VGA (640×480) and (1024×768) XGA which is 5/8; and VGA and SVGA (800×600) which is 5/4.

FIG. 1 shows a system 101 that uses the preferred embodiment to provide kernel coefficients to other interpolation circuits to perform interpolation. The system 101 contains a logic and control unit 103 connected to an index generator 105 and a fraction generator 107. The output of the fraction generator is connected to a coefficient calculator 113 which supplies kernel coefficients to two kernel coefficient look-up tables 109,111. The outputs of the two kernel coefficient look-up tables 109,111 are connected to a kernel coefficient readout circuit 115. The logic and control unit 103 is also connected to an index generator 105 which in turn supplies pairs of indices (i, j), according to constraints $max_x$, $max_y$ and the width of the output image, to both the fraction generator 107 and the kernel coefficient readout circuit 115.

The system 101 has two phases of operation: initialisation and execution. During the initialisation phase the logic and control unit 103 receives the input image width and height (number of pixels), and output image width and height (number of pixels), and calculates the horizontal sampling increment $step_x$, and vertical sampling increment $step_y$ which are provided to the fraction generator 107, and the horizontal maximum cycle count $max_x$, and vertical maximum cycle count $max_y$ which are provided to the index generator 105. The index generator 105 computes sequences of pairs of indices (i, j) according to constraints $max_x$ and $max_y$. The indices are provided to the fraction generator 107. Each pair of indices is then used by the fraction generator 107 to calculate $frac_x$ and $frac_y$, which are the fractional parts of the next x and y coordinates respectively. The fractions $frac_x$ and $frac_y$ are calculated using the following equations:

$$frac_x = fraction\_of(i * step_x)$$

$$frac_y = fraction\_of(j * step_y)$$

One of these fractions is then used by the coefficient calculator 113 to calculate the kernel coefficients for the horizontal kernel or the vertical kernel. One or more coefficients can be calculated at any time. These coefficients are then written into one of the kernel coefficient look-up tables 109,111. This process is repeated until all $max_x$ horizontal and $max_y$ vertical kernel coefficients are calculated.

During the execution phase, the logic and control unit 103 instructs the index generator 105 to compute sequences of pairs of indices (i, j) according to constraints $max_x$, $max_y$ and the width of the output image. Each index pair is then used by the coefficient readout circuit 115 to read out one or more coefficients from the kernel coefficient look-up tables 109, 111. The coefficient readout circuit 115 may output all coefficients that it receives, or it can select only a number of its coefficients to output.

Figure 2:
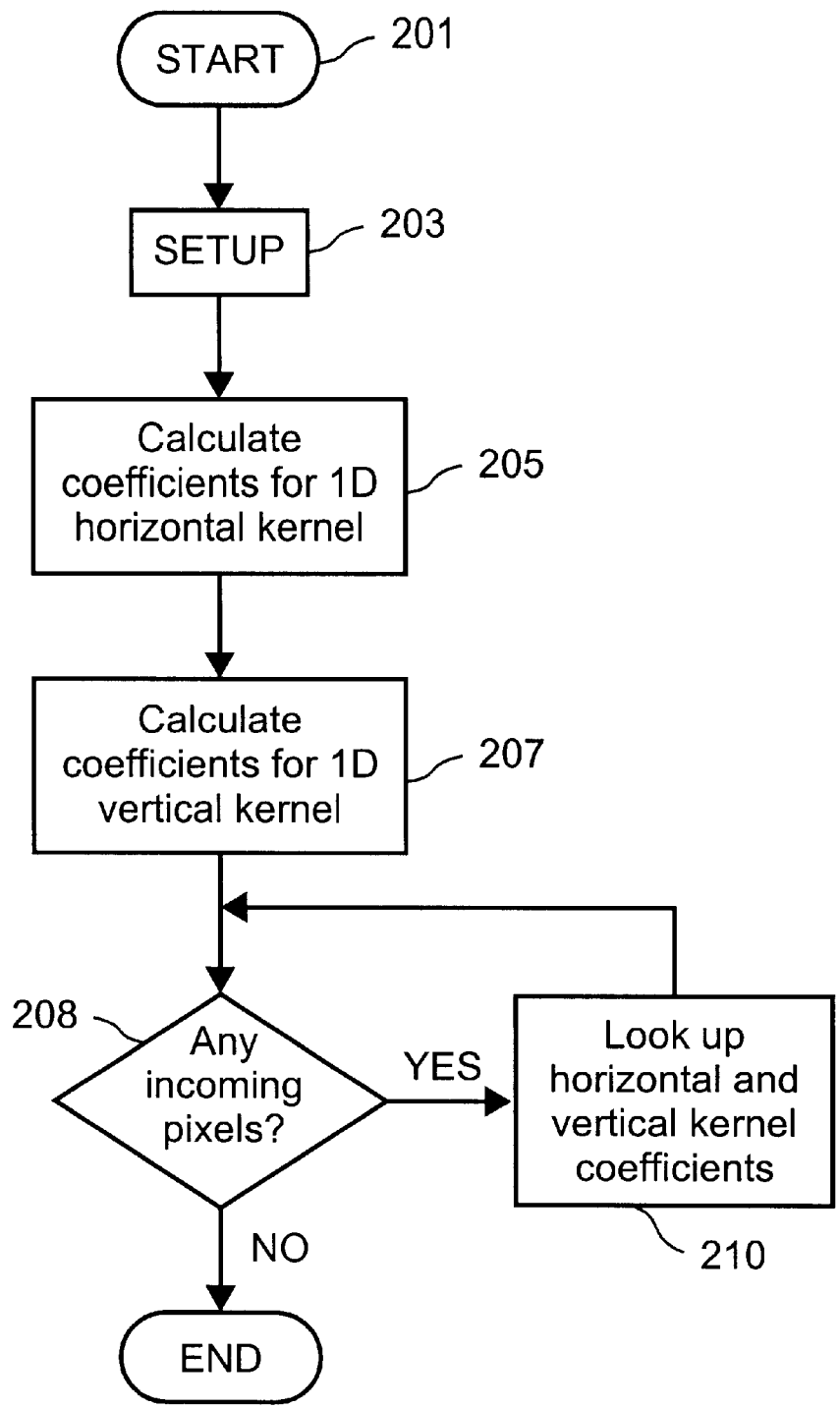
FIG. 2 is a flow diagram showing the preferred method of control provided by the logic and control unit of FIG. 1.

FIG. 2 is a flow diagram showing the preferred method of control provided by the logic and control unit 103 for the first embodiment. The method commences at step 201 where any necessary processes and parameters are initialised, such as process counters. At the next step 203, the logic control unit 103 performs a setup calculating the sampling increments $step_x$ and $step_y$, and the maximum cycle count $max_x$ and $max_y$. The process continues at step 205, where the logic and control unit 3 starts the index generator 105 to generate all coefficients in the horizontal kernel. The index generator 105 generates index i from 0 to $max_x-1$ and the fraction generator 107 generates all the fractions accordingly. All coefficients are written into the kernel coefficient look-up table 111. In the next step 207, all the modules perform the same procedure to generate all coefficients in the vertical kernel, and all coefficients are written into kernel coefficient look-up table 109. The process continues at the next step 208, where the logic and control unit 103 checks whether there are any incoming pixels. If there are, the LCU 103 signals the index generator 105 to generate indices for the coefficient readout circuit. In the next step 210, the coefficient readout circuit then reads out appropriate coefficients from the look-up tables so that interpolation on that source pixel can be performed.

Figure 3:
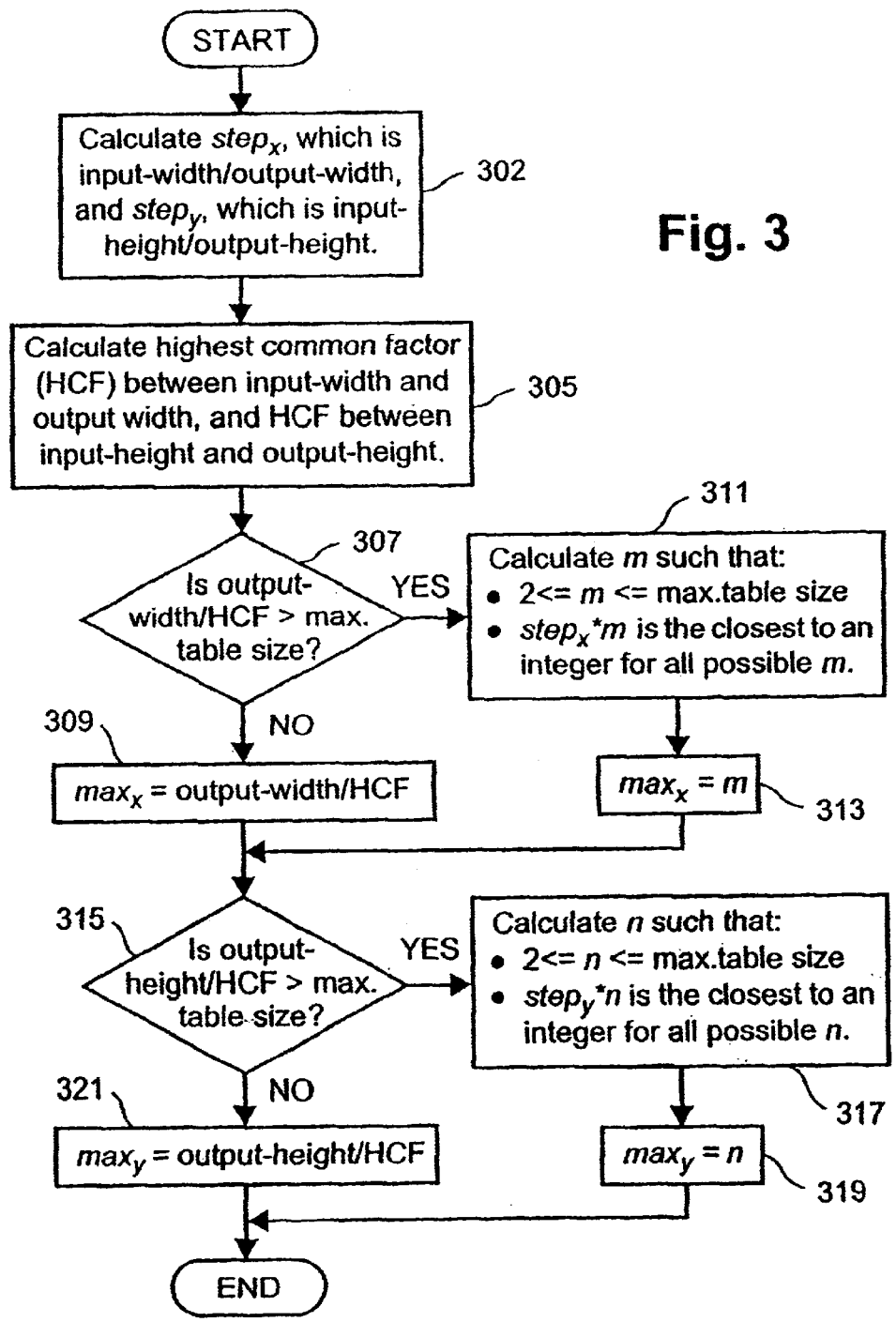
FIG. 3 is a flow diagram showing the preferred setup procedure performed provided by the logic and control unit of FIG. 1.

FIG. 3 is a flow diagram showing the preferred setup procedure preformed by the logic and control unit 103. The procedure commences at step 302, where the LCU first calculates the horizontal sampling increment $step_x$ by dividing the input image width with output image width. Similarly, the logic and control unit 103 calculates the vertical sampling increment $step_y$ by dividing input image height with output image height. In the next step 305, the LCU 103 calculates the highest common factor (HCF) between the input image width and output image width. The highest common factor (HCF) between the input image height and the output image height is also calculated. The HCF is preferably calculated using the Euclidean algorithm (ie: Euclid's algorithm) which is known in the prior art. The procedure continues at the next step 307, where the output image width is divided by the HCF and the LCU 3 determines if the dividend is less than the maximum table size. If the dividend is less than the maximum table size, then the dividend is the maximum horizontal cycle count maxx, at step 309. If it is greater, then the LCU 103 goes through all the integers from 2 to maximum table size, at step 311, and determines which integer m makes the product $step_x*m$ closest to an integer. The maximum horizontal cycle count $max_x$ is then equal to m, at step 313. The procedure then continues at steps 315, 317, 319 and 321, where the LCU uses the same method to determine $max_y$.

Figure 4:
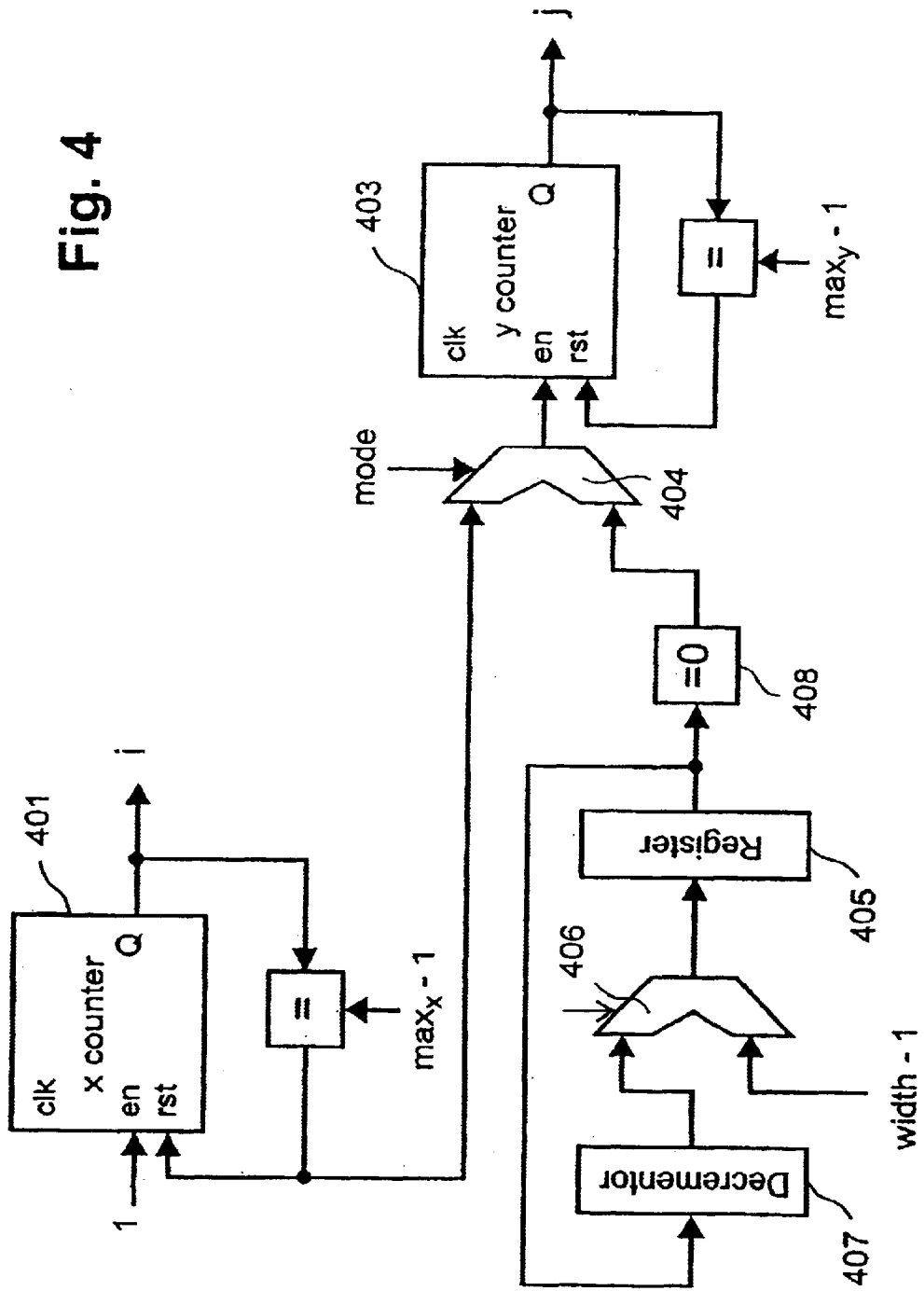
FIG. 4 is a schematic block diagram showing the index generator of FIG. 1 in more detail.

FIG. 4 shows the index generator 105 in more detail. On command from the logic and control unit 103, the index generator 105 operates in one of the two modes: initialisation and execution. When the index generator 105 is in the initiation mode, the switch 404 feeding the enable (on) input of the y-counter 403 is set to be equivalent to the reset (rst) signal applied to the x-counter. In execution modes, the switch 404 drives the enable input of the y-counter with the output of the comparator 408.

When the index generator 105 is in intialisation mode, the switch 406 feeding register 405 is set to take its input from the input line carrying value "width−1". In execution mode, the switch 406 drives the register with the output of the decrement or 407. In the initialisation mode, the index generator first resets both an x-counter 401 and a y-counter 403 to 0. Thereafter, whilst being clocked the x-counter 401 is incremented until it reaches $max_x-1$, it is reset to 0, and y-counter 403 is clocked to incremented until it reaches $max_y-1$. The initialisation phase finishes at this point.

Thus, when the index generator 105 enters execution mode the x-counter 401 and y-counter 403 are set to zero (0) and the register 405 is loaded with the value of the image width minus one (width−1). As enabled by the logic and control unit 103, the x-counter 401 is incremented until it reaches $max_x-1$, and the register 405 decrement by the decrementor 407. As the x-counter 401 reaches $max_x-1$ it is reset to zero (0). As the register 405 reaches zero (0) the y-counter is incremented and the x-counter is reset to zero (0). This procedure is repeated until the y-counter is incremented and the x-counter is reset to zero (0). This procedure is repeated until the y-counter reaches $max_x-1$. At this point a frame of interpolated output image is produced and the index generator 105 becomes idle.

Figure 5:
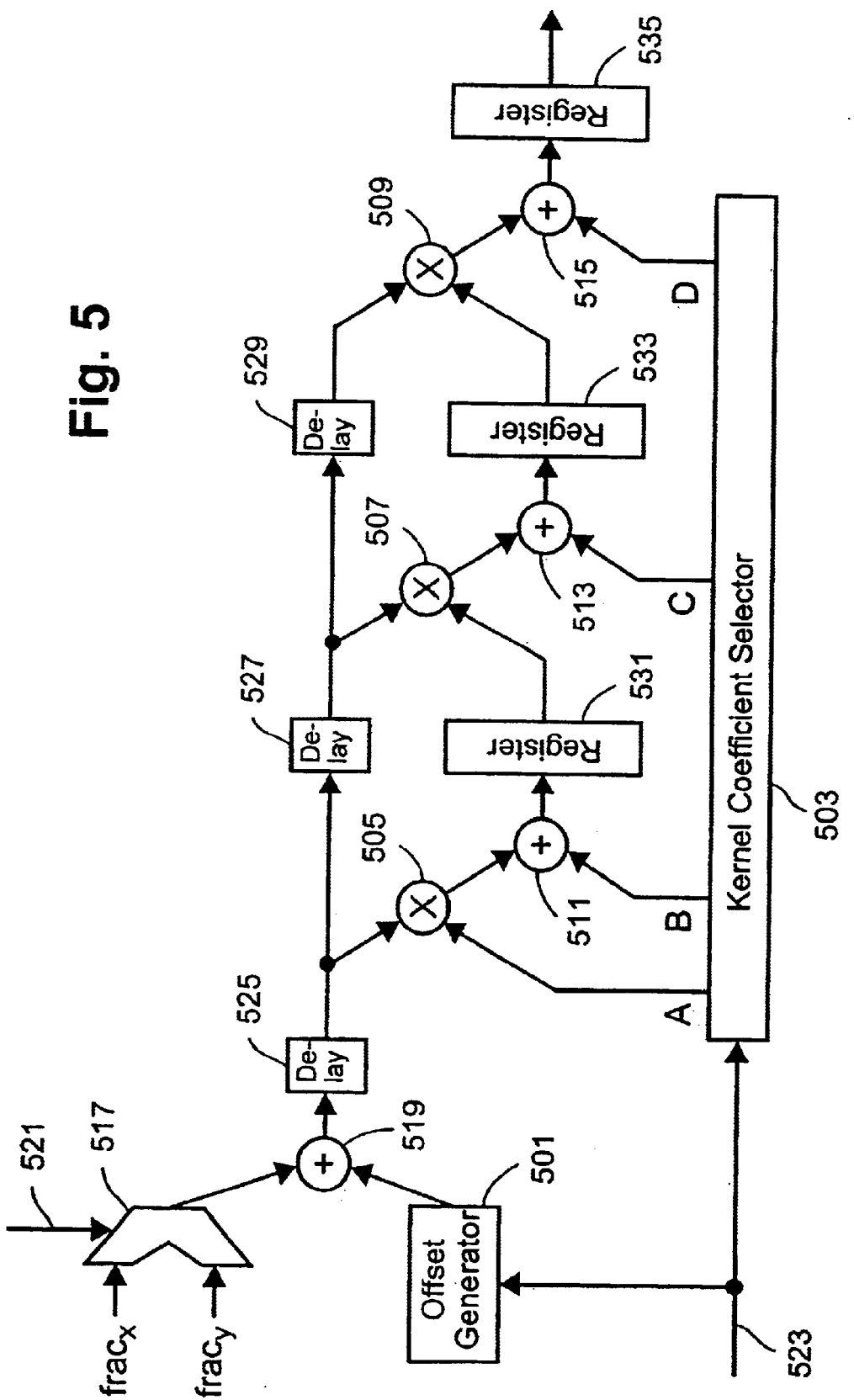
FIG. 5 is a schematic block diagram showing the coefficient calculator of FIG. 1 in more detail.

The coefficient calculator 113 will now be described in more detail with reference to FIG. 5. According to the configuration signal from the logic and control unit 103 on line 521, one of the fractions from x and y coordinates stored in latch 517 is added by an adder 519 to an offset generated by an offset generator 501 according to information from LCU 103 on line 523. In the preferred embodiment, the offset can be −1, 0, 1 or 2. The sum is then input to a pipeline of delays (525,527,529) multipliers (505,507,509) and adders (511,513,515) and multiplied and added with coefficients A, B, C and D generated by the kernel coefficient selector 505. The coefficients generated depend on the kernel that is used for interpolation (e.g. Cubic, quadratic, since, etc), and the configuration information from LCU 103, which indicates what offset is added to the fraction. For example, when a cubic kernel with parameters a=0.5 is used, A equals to 2, B equals −3, C equals to 0, and D equals to 1. The outputs of each adder (511,513,515) are temporarily stored in registers (531,533,535) before being forwarded to the next multiplier stage.

Figures 6A, 6B:
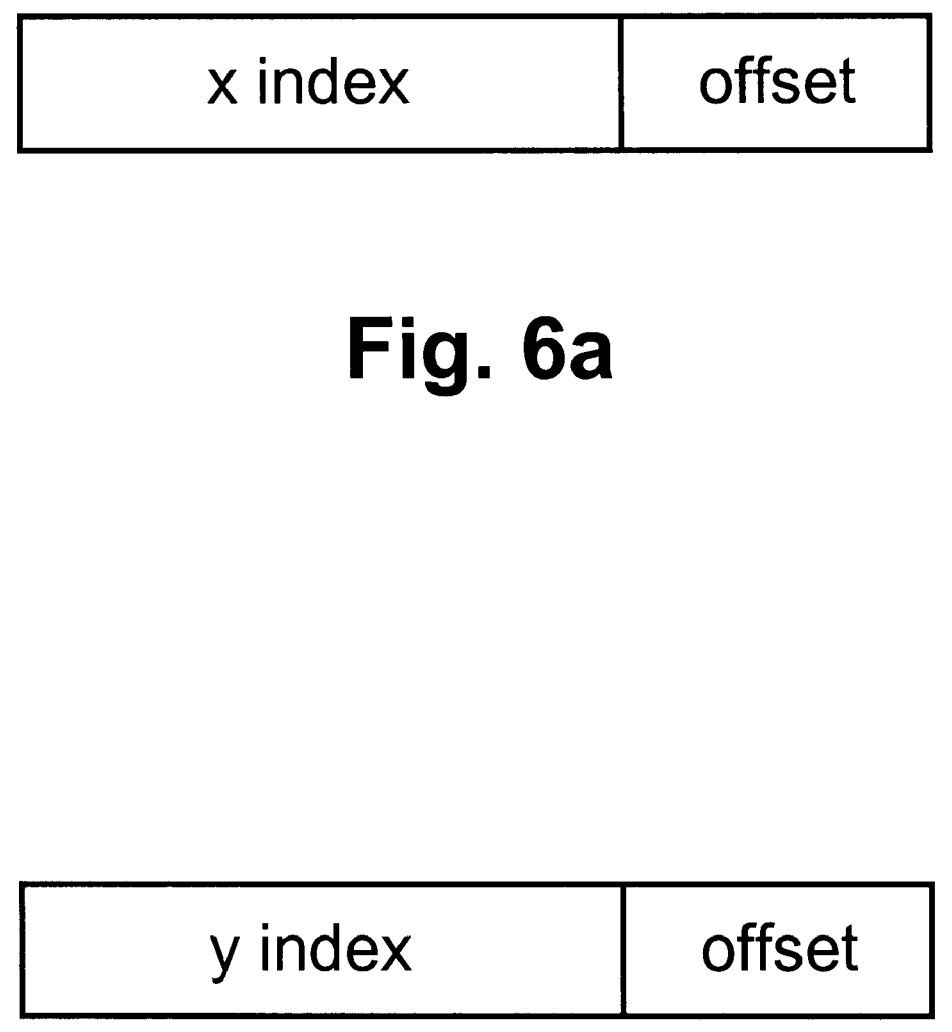

FIG. 6a illustrates the preferred address format of the kernel coefficient look-up table 111. The "offset" field can range from 0 to 3, where 0 represents an offset of −1, 1 represents an offset of 0, 2 represents an offset of 1, and 3 represents an offset of 2. The x index is obtained from the index generator 105. FIG. 6b illustrates the preferred address format to the kernel coefficient look-up table 109. The "offset" field can range from 0 to 3, where 0 represent an offset of −1, 1 represents an offset of 0, 2 represent an offset of 1, and 3 represent an offset of 2. The y index is obtained from the index generator 105.

For a more detailed explanation of the first embodiment reference is made to the following example.

Example 1

In this example the system 1 of the first embodiment is scaling an image with VGA resolution (640×480) to XGA resolution (1024×768).

During the setup phase of the logic and control unit 103 it calculates that:

(i) $step_x$ and $step_y$ are both 5/8;

(ii) the HCF for input image width and output image width is 128;

(iii) the HCF for input image height and output image height is 96; and (iv) $max_x$ and $max_y$ are both 8, which are both smaller than the maximum table size.

Next, the LCU 103 signals the index generator 105 to begin generating sequences of indices according to $max_x$ and $max_y$, and the sequence that it will generate is {(0,0), (1,0), (2,0), (3,0), (4,0), (5,0), (6,0) (7,0), (0,0), (0,1), (0,2), (0,3), (0,4), (0,5), (0,6), (0,7)}.

From the above sequence of indices, the fraction generator 107 will generate the following sequence of pairs of fractions:

(0,0), (5/8,0), (2/8,0), (7/8,0), (4/8,0), (1/8,0), (6/8,0), (3/8,0), (0,0), (0,5/8), (0,2/8), (0,7/8), (0,4/8), (0,1/8), (0,6/8), (0,3/8).

From this sequence, the coefficient calculator 113 evaluates the kernel equation using those fractions, and writes 8 entries into kernel coefficient LUT 111, representing the horizontal kernel, and 8 entries into kernel coefficient LUT 109, representing the vertical kernel. Each of these entries has 4 values, one for each offset. (For cubic interpolation, the offset can be −1, 0, 1, or 2).

After the LUTs (109,111) are initialised, the system is now ready to accept pixels. When enough pixels have come to generate the first interpolated pixel, the logic and control unit 103 will signal the index generator 105 to start generating pairs of indices. The following sequence will be generated:

(0,0), (1,0), (2,0), 3,0), (4,0), (5,0), (6,0), (7,0), (0,0), (1,0), (2,0), . . . (this cycle will continue until 1024 pairs of indices are generated.) . . . (0,1), (1,1), (2,1), (3,1), (4,1), (5,1) . . . .

This sequence is used to access the LUTs 109 and 111 and the stored coefficients are then used to interpolate the required sample.

Figure 7:
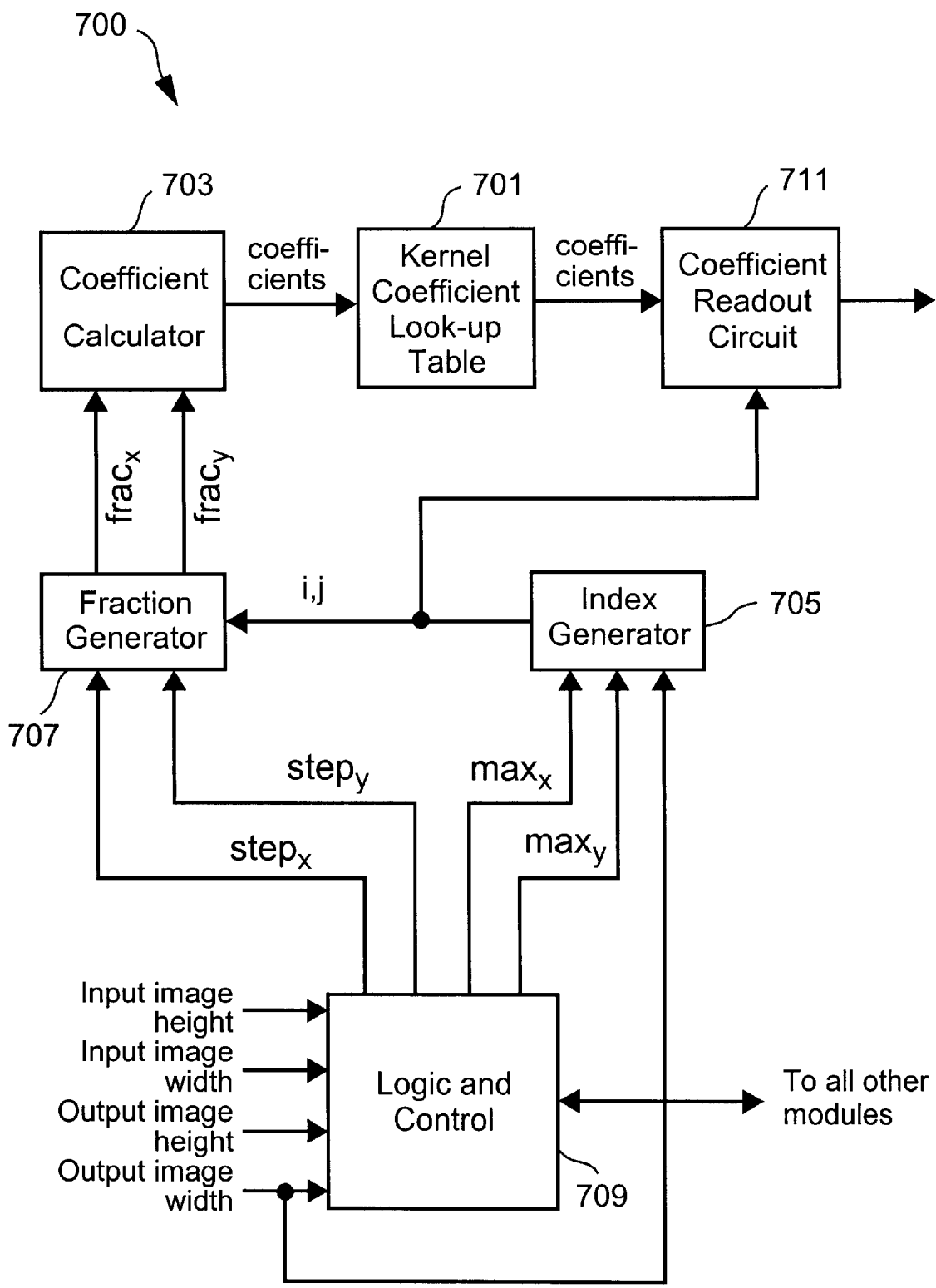
FIG. 7 is a schematic block diagram showing a system for providing kernel coefficients in accordance with a second embodiment of the present invention.

Referring to FIG. 7, there is shown in block diagram form a second embodiment which is directed to allow the LUT 701 to work with kernels which are not separable.

When the interpolation kernel cannot be separated into a 1D horizontal kernel and a 1D vertical kernel, the coefficient calculator 703 requires both $frac_x$ and $frac_y$ to calculate the kernel coefficients. In the initialisation phase, instead of incrementing only one of the indices and leaving the other to 0, the index generator 705 generates a sequence of $max_x*max_y$ pairs of indices (i,j) to the fraction generator 707. The fraction generator 707 generates $frac_x$ and $frac_y$ according to the pair of indices it receives, and for each pair of fractions the coefficient calculator 703 computes k*l kernel coefficients for it, where k is the number of rows in the kernel matrix and l is the number of columns in the kernel matrix. In the preferred embodiment both k and l are equal to 4.

Figure 8:
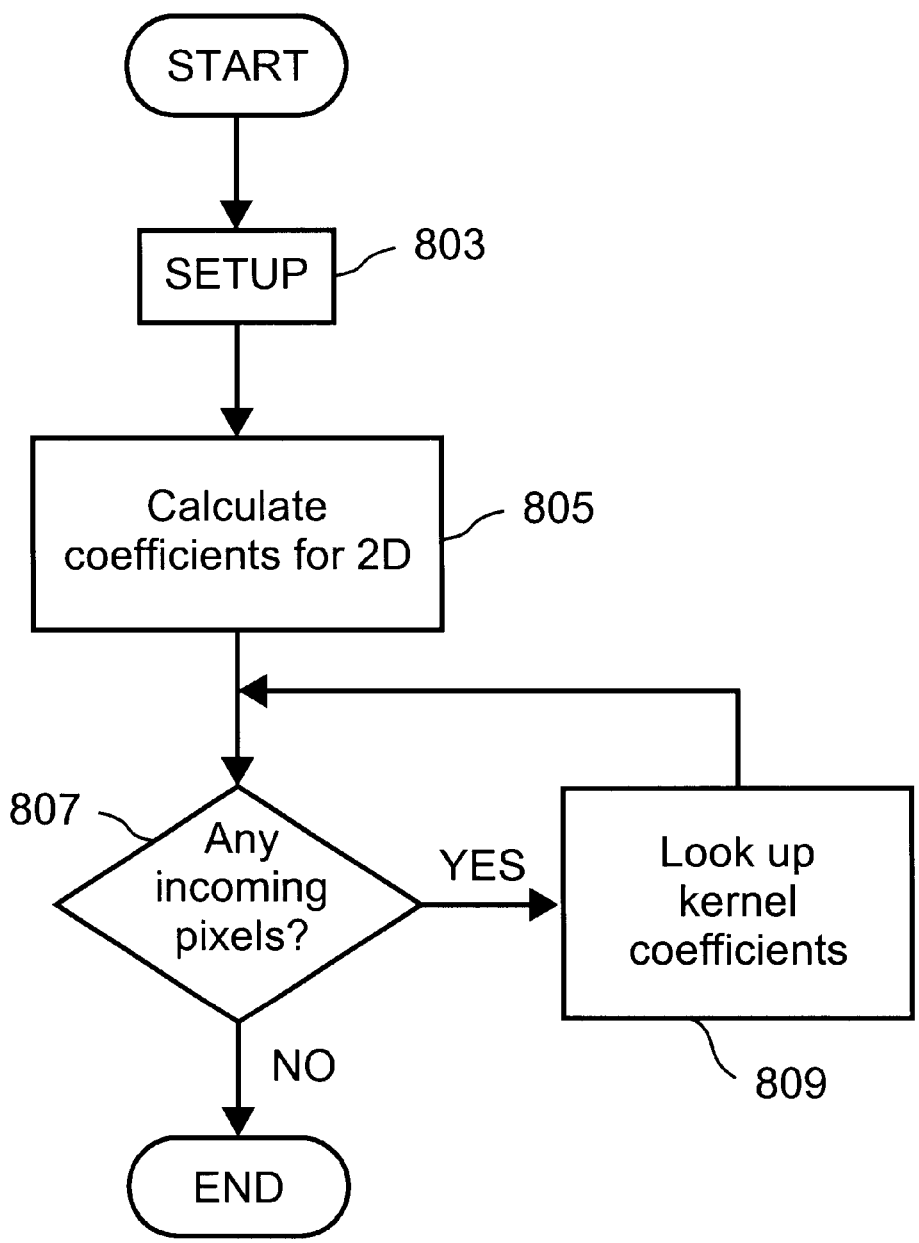
FIG. 8 is a flow diagram showing the preferred method of control provided by the logic and control unit of FIG. 7.

FIG. 8 is a flow diagram showing the preferred method of control provided by the logic and control unit 709 in the second embodiment. The method commences at step 803 where the system 700 performs a setup procedure as described in FIG. 3. The process continues at step 805, where the LCU 709 signals the index generator 705 to begin generating sequences of indices in the following fashion:

(i) reset both i and j to 0;

(ii) in every cycle, increment i until i reaches $max_x-1$;

(iii) increment j, and reset i to 0;

(iv) repeat steps (ii) and (iii) until j reaches $max_y-1$ and i reaches $max_x-1$.

After that the kernel coefficient look-up table 701 should be filled up, and the initialisation phase is finished. At step 807, when enough incoming pixels have arrived for the interpolation system 700 to perform interpolation, the LCU 709 will signal the index generator 705 to generate pairs of indices in the same fashion as described above. Further, when enough incoming pixels have arrived for the interpolation system 700 to perform interpolation the coefficient readout circuit 711 will read the appropriate entries in the kernel coefficient look-up table 701, at step 809, to provide the k*l kernel coefficients for interpolation, where k is the number of rows in the kernel matrix and l is the number of columns in the kernel matrix.

For a more detailed explanation of the second embodiment reference is made to the following example.

Example 2

In this example the system 700 of the second embodiment is scaling an image with VGA resolution (640×480) to XGA resolution (1024×768).

During the setup phase of the logic and control unit 709 it calculates that $step_x$ and $step_y$ are both 5/8, and $max_x$ and $max_y$ are both 8. After that, the LCU 709 signals the index generator 705 to begin generating sequences of indices according to $max_x$ and $max_y$, and the sequence that it will generate is {(0,0), (1,0), (2,0), (3,0), (4,0), (5,0), (6,0), (7,0), (0,1), (1,1), (2,1), (3,1), (4,1), (5,1), (6,1), (7,1), )9,2), (1,2), . . . (0,7), (1,7), (2,7), (3,7), (4,7), (5,7), (6,7), (7,7)}.

From the above sequence of indices, the fraction generator 707 will generate the following sequence of pairs of fractions:

(0,0), (5/8,0), (2/8,0), (7/8,0), 4/8,0), (1/8,0), (3/8,0), (0,5/8), (2/5/8), (7/8,5/8), . . . (0,3/8), (5/8,3/8), (2/8,3/8), (7/8,3/8), (4/8,3/8), (1/8,3/8), (6/8,3/8), (3/8,3/8).

From this sequence, the coefficient calculator 703 evaluates the 701 kernel equation using those fractions, and writes 64 entries into kernel coefficient LUT 701. Each of these entries has 16 values, one for each combination of offsets to x and y fractions. (For cubic interpolation, the offset combinations can be (−1,−1), (−1,0), (−1,1), (−1,2), (0,−1), (0,0), (0,1), (0,2), (1,1), (1,0), (1,1), (1,2), (2,−1), (2,0), (2,1), (2,2)).

After the LUT 701 is initialised, the system 700 is now ready to accept pixels. When enough pixels have come to generate the first interpolated pixel, the logic and control unit 709 will signal the index generator to start generating pairs of indices. The following sequence will be generated:

(0,0), (1,0), (2,0), (3,0), (4,0), (5,0), (6,0), (7,0), (0,0), (1,0), (2,0), . . . (this cycle will continue until 1024 pairs of indices are generated) . . . (0,1), (1,1), (2,1), (3,1), (4,1), (5,1), . . . .

This sequence is used to access the LUTs 109 and 111 and the stored coefficients are then used to interpolate the required sample.

A third embodiment will now be described with reference to FIG. 9 and FIG. 10. The third embodiment is directed to alleviate the need to calculate the HCF between the output image width and input image width, and the HCF between the output image height and input image height. This embodiment contains the same module as the first embodiment, however, the need for the LCU 901 to use HCFs to calculate $max_x$ and $max_y$ is removed. The lines 117, 119 carrying the signals $max_x$ and $max_y$ of the first embodiment are removed. Further, a line 913 carrying the signal zerofrac is fed from the fraction generator 903 to the LCU 901. The LCU 901 determines the values of $max_x$ and $max_y$ by observing the status of the signal zerofrac from the fraction generator 903, which is asserted when the fractional part of x or y is close to or equal to 0. When zerofrac is asserted, the LCU 901 records what value of the index i or j corresponds to that assertion, and that would be $max_x$ and $max_y$ respectively. In the third embodiment, in the initialisation phase the index generator 905 firstly resets j to 0, and increments the index i until either the signal zerofrac is asserted, or the maximum table size is reached. After that, it resets i to 0 and increments the index j from 0 until either the signal zerofrac is asserted, or the maximum table size is reached. In the execution phase, the index generator 905 generates pairs of indices (i,j) according to the $max_x$ and $max_y$ found in exactly the same way as it does in first embodiment.

The overall operation of the LCU 901 in the initialisation phase is further explained with reference to FIG. 10. At step 1001, the LCU 901 calculates the horizontal sampling increment $step_x$ and vertical sampling increment $step_y$. Next at step 1003, the LCU 901 signals the index generator 905 to start incrementing index I, and observe the index J and the signal zerofrac. When zerofrac is 1 at step 1005, it assigns I to $max_x$ at step 1007. When zerofrac is 0 and I equals to the maximum table size, the LCU 901 determines the value of $max_x$ by finding an integer m such that $step_x*m$ is closest to an integer at step 1011. The process continues at step 1013, where m is assigned to be $max_x$. At step 1015, the LCU 901 signals the index generator to start incrementing j, and reset I to 0. The LCU 901 then observes the index j and the signal zerofrac at step 1017. When zerofrac is 1, it assigns j to $max_y$ at step 1019. When zerofrac is 0 and j reaches the maximum table size at step 1021, the LCU 901 determines the values of $max_y$ by finding an integer n such that $step_y*n$ is closest to an integer at step 1023. Finally at step 1025, n is assigned to be $max_y$. Steps 1004,1007,1009 and 1016 are self-explanatory.

For a more detailed explanation of the third embodiment reference is made to the following example.

Example 3

In this example the system 900 of the third embodiment is scaling an image with VGA resolution (640×480) to XGA resolution (1024×768).

During the setup phase of the logic and control unit 901 it calculates that $step_x$ and $step_y$ are both 5/8. After that, the LCU 901 signals the index generator 905 to begin generating sequences of indices with only I incrementing. The sequence that it will generate is {(0,0), (1,0), (2,0), (3,0), (4,0), (5,0), (6,0), (7,0)}. When I reaches 8, the x fraction will be 0 and the signal zerofrac will be asserted. At that point, LCU 901 assigns 7 to $max_x$.

Next, the LCU 901 signals the index generator 905 to begin generating sequences of indices with only j incrementing. The sequence that it will generate is {(0,0)}, (0,1), (0,2), (0,3), (0,4), (0,5), (0,6), (0,7)}. When j reaches 8, the y fraction will be 0 and the signal zerofrac will be asserted. At that point, LCU 901 assigns 7 to $\max_y$.

From the above sequences of indices, the fraction generator 903 will generate the following sequence of pairs of fractions:

(0,0) (5/8,0), (2/8,0), (7/8,0), (4/8,0) (1/8,0), (6/8,0), (3/8, 0), (0,0), (0,5/8), (0,218), (0,7/8), (0,4/8), (0,1/8), (0,6/8), (0,3/8).

From this sequence, the coefficient calculator 907 evaluates the kernel equation using those fractions, and writes 8 entries into kernel coefficient LUT 909, representing the horizontal kernel, and 8 entries into kernel coefficient LUT 911, representing the vertical kernel. In the preferred embodiment, each of these entries has 4 values, one for each offset. (For cubic interpolation, the offset can be −1, 0, 1, or 2).

After the LUTs 909, 911 are initialised, the system 900 is now ready to accept pixels. When enough pixels have come to generate the first interpolated pixel, the logic and control unit 901 will signal the index generator 905 to start generating pairs of indices. The following sequence will be generated:

(0,0), (1,0), (2,0), (3,0), (4,0), (5,0), (6,0), (7,0), (0,0), (1,0), (2,0), . . . (this cycle will continue until 1024 pairs of indices are generated) . . . (0,1), (1,1), (2,1), (3,1). (4,1), (5,1) . . . .

This sequence is used to access the LUTs 109 and 111 and the stored coefficients, provided via the coefficient readout circuit 915, are then used to interpolate the required sample.

PREFERRED EMBODIMENT OF APPARATUS(S)

Figure 9:
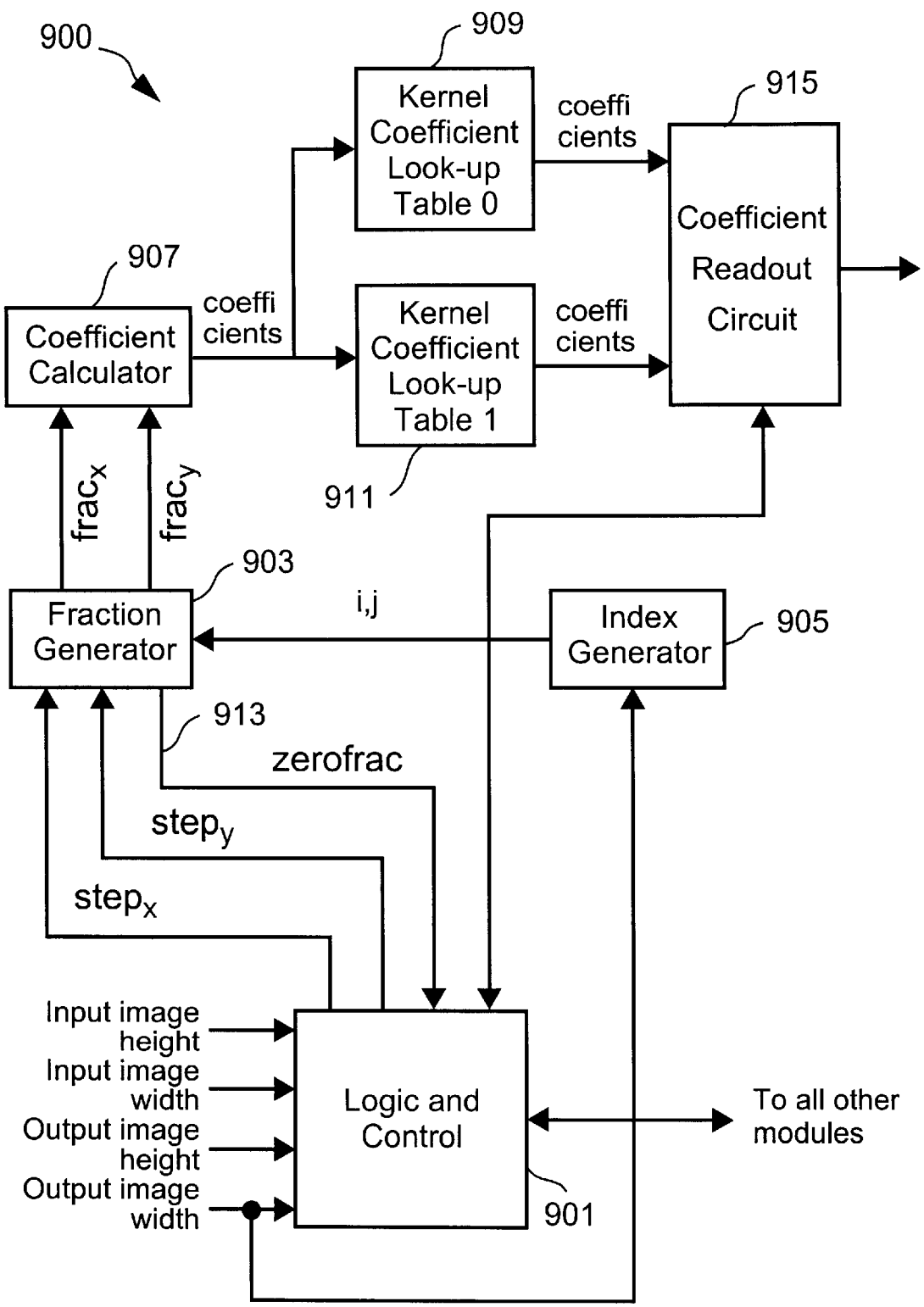
FIG. 9 is a schematic block diagram showing a system for providing kernel coefficients in accordance with a second embodiment of the present invention.
Figure 10:
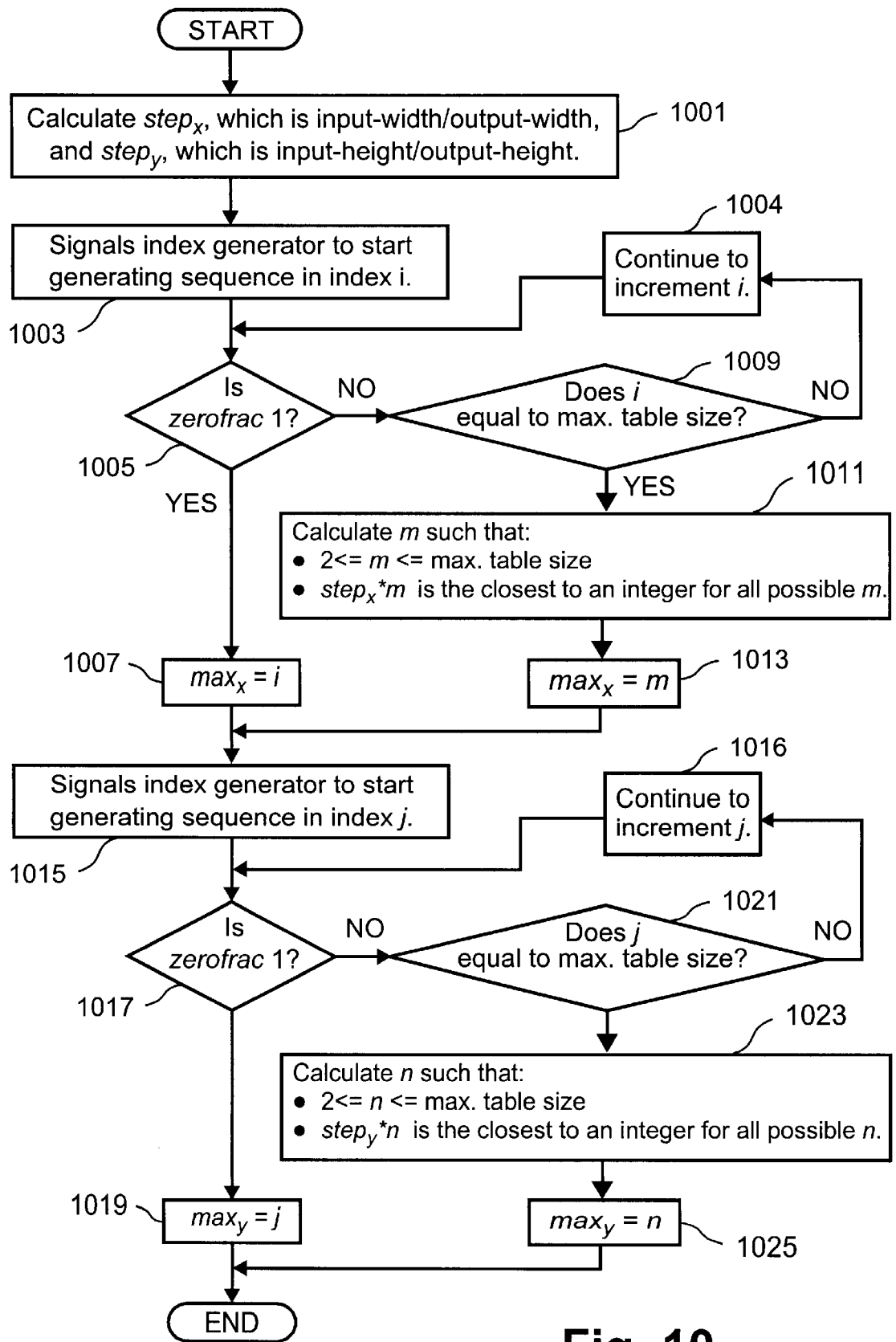
FIG. 10 is a flow diagram showing the preferred method of control provided by the logic and control unit of FIG. 9.
Figure 11:
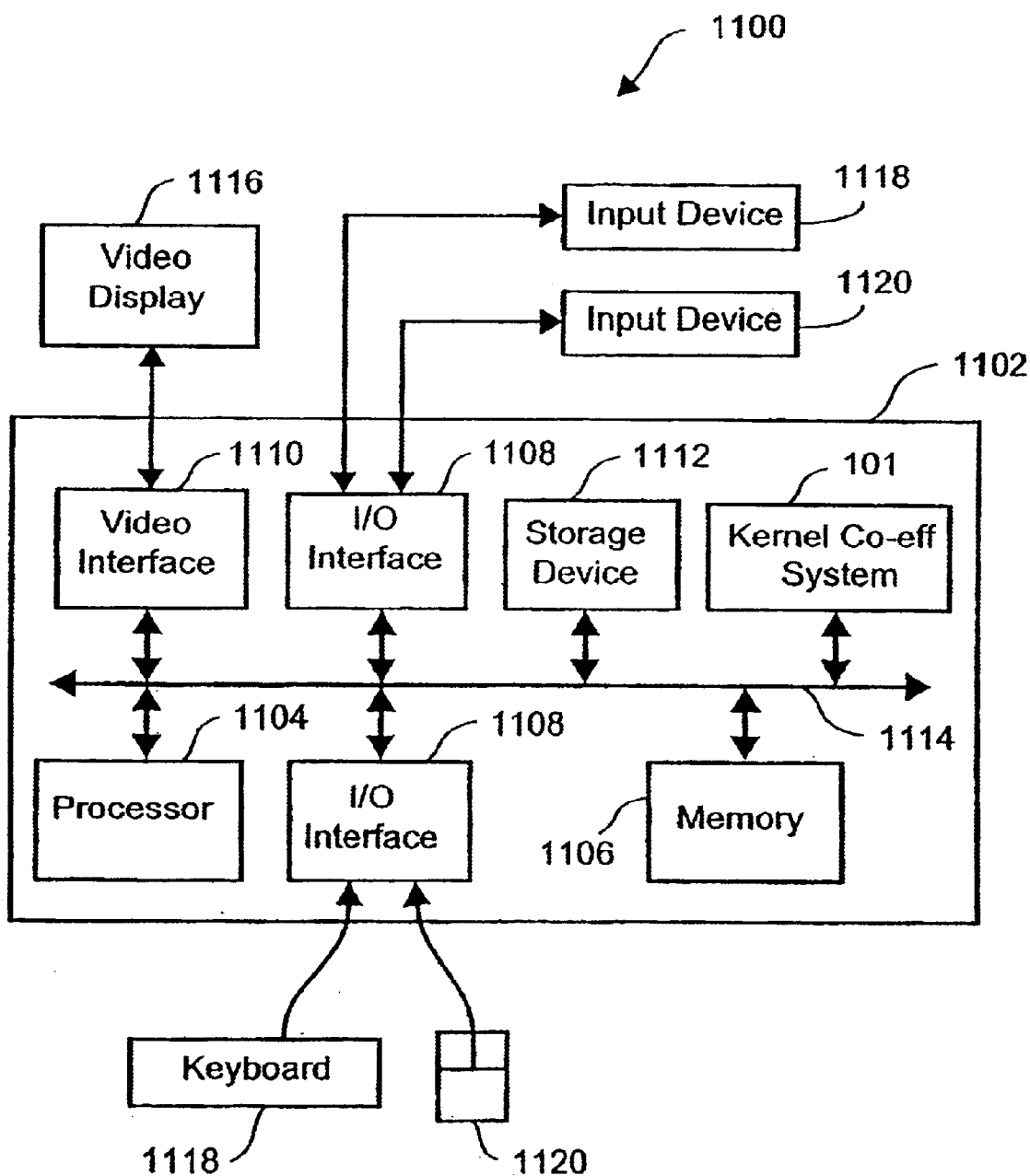
FIG. 11 is a diagram showing a general purpose computer upon which the embodiments of the present invention can be implemented.

The embodiments are preferably implemented as part of a conventional general-purpose computer system, such as the computer system 1100 shown in FIG. 11, wherein the systems 101, 700 and 900 of FIGS. 1, 7 and 9, respectively can be implemented as part of a plug-in board. Alternatively, the systems 101, 700 and 900 can be implemented as part of a video interface (not shown) or graphics processor(not shown).

The processes described with reference to FIGS. 1 to 10 can also be implemented as software executing on the computer system 1100. In particular, the steps of the methods are effected by instructions in the software that are carried out by the computer. The software can be divided into two separate parts; one part for carrying out the methods of the embodiments; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for orientating a character stroke or n-dimensional finite space curves in accordance with the embodiments of the invention.

The computer system 1100 has a computer module 1102, a video display 1116, and input devices 1118, 1120. In addition, the computer system 1100 can have any of a number of other output devices including line printers, laser printers, plotters, and other reproduction devices coned to the computer module 1102. The computer system 1100 can be connected to one or more other computers via a communication interface using an appropriate communication channel such as a modem communications path, a computer network, or the like. The computer network can include a local area network (LAN), a wide area network (WAN), an Intranet, and/or the Internet.

The computer module 1102 has a central processing unit(s) (simply referred to as a processor hereinafter) 1104, a memory 1106 which can include random access memory (RAM) and read-only memory (ROM), input/output (IO) interfaces 1108, a video interface 1110, and one or more storage devices generally represented by a block 1112 in FIG. 1. The storage device(s) 1112 can include one or more of the following: a floppy disc, a hard disc drive, a magneto-optical disc drive, CD-ROM, magnetic tape or any other of a number of non-volatile storage devices well known to those skilled in the art. Each of the components 1104 to 1112 and the system 101 are typically connected to one or more of the other devices via a bus 1114 that in turn has data, address, and control buses.

The video interface 1110 is connected to the video display 1116 and provides video signals from the computer 1102 for display on the video display 1116. User input to operate the computer 1102 can be provided by one or more input devices 1118. For example, an operator can use the keyboard input device 1118 and/or a pointing device such as the mouse input device 1120 to provide input to the computer 1102.

The computer system 1100 is simply provided for illustrative purposes and other configurations can be employed without departing from the scope and spirit of the invention. Exemplary computers on which the embodiment can be practiced include the IBM-PC or compatibles, one of the Macintosh™ family of PCs, Sun Sparcstation™, arrangements evolved therefrom or the like. The foregoing are merely exemplary of the types of computers with which the embodiments of the invention can be practiced. Typically, the processes of the embodiments, described hereinafter, are resident as software or a program recorded on a hard disk drive (generally depicted as block 1112 in FIG. 11) as the computer readable medium, and read and controlled using the processor 1104. Intermediate storage of the program and pixel data and any data fetched from the network can be accomplished using the semiconductor memory 1106, possibly in concert with the hard disk drive 1112.

In some instances, the program can be supplied to the user encoded on a CD-ROM or a floppy disk (both generally depicted by block 1112), or alternatively could be read by the user from the network via a modem device connected to the computer, for example. Still further, the software can also be loaded into the computer system 1300 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums can be practiced without departing from the scope and spirit of the invention.

The foregoing only describes one embodiment of the present invention, however, modifications and/or changes can be made thereto by a person skilled in the art without departing from the scope and spirit of the invention.

What is claimed is:

1. A method of performing interpolation on a first set of discrete data values representing an image with a first resolution to produce a second set of discrete data values representing the image with a second resolution, the method comprising the following steps:
  (i) providing dimension values corresponding to said first set of discrete data values and said second set of discrete data values;
  (ii) calculating a first sampling increment value, a second sampling increment value, a first sampling limit value and a second sampling limit value, for said first set of discrete data values, using said dimension values;
  (iii) computing pairs of interpolation indicators according to said first and second sampling limit values;
  (iv) calculating a plurality of filter function coefficients, using said interpolation indicators and at least one of a plurality of filter functions;
  (v) storing said filter function coefficients;
  (vi) accessing said stored filter function coefficients; and
  (vii) performing interpolation on said first set of discrete data values, using said accessed filter function coefficients, to generate said second set of discrete data values.

2. A method according to claim 1, wherein a filter function coefficient is calculated for each of said interpolation indicators.

3. A method according to claim 1, wherein the filter function is a cubic function.

4. A method according to claim 1, wherein the filter function is a linear function.

5. The method according to claim 1, wherein the filter function is a quadratic function.

6. The method according to claim 1, wherein the filter function is a sinc function.

7. The method according to claim 1, wherein said filter function is a two-dimensional function.

8. An apparatus for performing interpolation on a first set of discrete data values representing an image with a first resolution to produce a second set of discrete data values representing the image with a second resolution, the apparatus comprising:
  calculator means for providing dimension values corresponding to said first set of discrete data values and said second set of discrete data values, and calculating a first sampling increment value, a second sampling increment value, a first sampling limit value and a second sampling limit value, for said first set of discrete data values, using said dimension values;
  processor means for computing pairs of interpolation indicators according to said first and second sampling limit values, and for calculating a plurality of filter function coefficients, using said interpolation indicators and at least one of a plurality of filter functions;
  storage means for storing said filter function coefficients;
  storage access means for accessing said stored filter function coefficients; and
  interpolation means for performing interpolation on said first set of discrete data values, using said accessed filter function coefficients, to generate said second set of discrete data values.

9. The apparatus according to claim 8, wherein a filter function coefficient is calculated for each of said interpolation indicators.

10. The apparatus according to claim 8, wherein the filter function is a cubic function.

11. The apparatus according to claim 8, wherein the filter function is a linear function.

12. The apparatus according to claim 8, wherein the filter function is a quadratic function.

13. The apparatus according to claim 8, wherein the filter function is a sinc function.

14. The apparatus according to claim 8, wherein said filter function is a two-dimensional function.

15. A computer readable medium for storing a program for an apparatus which processes data, said processing comprising a method of performing interpolation on a first set of discrete data values representing an image with a first resolution to produce a second set of discrete data values representing the image with a second resolution, said program comprising:
  code for providing dimension values corresponding to said first set of discrete data values and said second set of discrete data values;
  code for calculating a first sampling increment value, a second sampling increment value, a first sampling limit value and a second sampling limit value, for said first set of discrete data values, using said dimension values;
  code for computing pairs of interpolation indicators according to said first and second sampling limit values;
  code for calculating a plurality of filter function coefficients, using said interpolation indicators and at least one of a plurality of filter functions;
  code for storing said filter function coefficients;
  code for accessing said stored filter function coefficients; and
  code for performing interpolation on said first set of discrete data values, using said accessed filter function coefficients, to generate said second set of discrete data values.

16. The computer readable medium according to claim 15, wherein a filter function coefficient is calculated for each of said interpolation indicators.

17. The computer readable medium according to claim 15, wherein the filter function is a cubic function.

18. The computer readable medium according to claim 15, wherein the filter function is a linear function.

19. The computer medium according to claim 15, wherein the filter function is a quadratic function.

20. The computer readable medium according to claim 15, wherein the filter function is a sinc function.

21. The computer readable medium according to claim 15, wherein said filter function is a two-dimensional function.

22. A method of performing interpolation on a pixel-based image, the method comprising the steps of:
  (i) providing dimension values corresponding to a first image and a second image;
  (ii) calculating a first sampling increment value, a second sampling increment value, a first sampling limit value and a second sampling limit value, for said first image, using said dimension values;
  (iii) computing pairs of interpolation indicators according to said first and second sampling limit values;
  (iv) calculating a plurality of filter function coefficients, using said interpolation indicators and at least one of a plurality of filter functions;
  (v) storing said filter function coefficients;
  (vi) detecting incoming pixels of said first image;
  (vii) accessing said stored filter function coefficients; and
  (viii) performing interpolation on said pixels of said first image, using said accessed filter function coefficients, to generate said second image.

23. A method according to claim 22, wherein a filter function coefficient is calculated for each of said interpolation indicators.

24. The method according to claim 22, wherein the filter function is a cubic function.

25. The method according to claim 22, wherein the filter function is a linear function.

26. The method according to claim 22, wherein the filter function is a quadratic function.

27. The method according to claim 22, wherein said first image is a colour image.

28. The method according to claim 22, wherein said filter function is a two-dimensional function.

29. An apparatus for performing interpolation on a pixel-based image, the apparatus comprising:
- calculator means for providing dimension values corresponding to a first image and a second image, and calculating a first sampling increment value, a second sampling increment value, a first sampling limit value and a second sampling limit value, for said first image, using said dimension values;
- processor means for computing pairs of interpolation indicators according to said first and second sampling limit values, and calculating a plurality of filter function coefficients, using said interpolation indicators and one of a plurality of filter functions;
- storage means for storing said filter function coefficients;
- detection means for detecting incoming pixels of said first image;
- coefficient access means for accessing said stored filter function coefficients; and
- an interpolator for performing interpolation on said pixels of said first image, using said accessed filter function coefficients, to generate said second image.

30. The apparatus according to claim 29, wherein a filter function coefficient is calculated for each of said interpolation indicators.

31. The apparatus according to claim 29, wherein the filter function is a cubic function.

32. The apparatus according to claim 29, wherein the filter function is a linear function.

33. The apparatus according to claim 29, wherein the filter function is a quadratic function.

34. The apparatus according to claim 29, wherein the filter function is a sinc function.

35. The apparats according to claim 29, wherein said first image is a colour image.

36. The apparatus according to claim 29, wherein said filter function is a two-dimensional function.

37. A computer readable medium storing a program for an apparatus which processes data, said processing comprising a method of performing interpolation on a pixel-based image, said program comprising:
- code for providing dimension values corresponding to a first image and a second image, and calculating a first sampling increment value, a second sampling increment value, a first sampling limit value and a second sampling limit value, for said first image, using said dimension values;
- code for computing pairs of interpolation indicators according to said first and second sampling limit values;
- code for calculating a plurality of filter function coefficients, using said interpolation indicators and one of a plurality of filter functions;
- code for storing said filter function coefficients;
- code for detecting incoming pixels of said first image;
- code for accessing said stored filter function coefficients; and
- code for performing interpolation on said pixels of said first image, using said accessed filter function coefficients, to generate said second image.

38. The computer readable medium according to claim 37, wherein a filter function coefficient is calculated for each of said interpolation indicators.

39. The computer readable medium according to claim 37, wherein the filter function is a cubic function.

40. The computer readable medium according to claim 37, wherein the filter function is a linear function.

41. The computer readable medium according to claim 37, wherein the filter function is a quadratic function.

42. The computer readable medium according to claim 37, wherein the filter function is a sinc function.

43. The computer readable medium according to claim 37, wherein said first image is a colour image.

44. The computer readable medium according to claim 37, wherein said filter function is a two-dimensional function.

45. A method of performing interpolation on a pixel-based image, the method comprising the steps of:
- (i) inputting dimension values corresponding to a first image and a second image;
- (ii) calculating a first sampling increment value, a second sampling increment value, a first sampling limit value arid a second sampling limit value, for said first image, using said dimension values;
- (iii) computing interpolation indicators for said second image according to said first and second sampling limit values;
- (iv) calculating filter function coefficients using said interpolation indicators and a filter function, wherein only those filter function coefficients required for said dimension values are calculated;
- (v) storing said filter function coefficients;
- (vi) detecting incoming pixels of said first image;
- (vii) accessing said stored filter function coefficients; and
- (viii) performing interpolation on said pixels of said first image, using said accessed filter function coefficients, to generate said second image.

46. The method according to claim 45, wherein the filter function is a cubic function.

47. The method according to claim 45, wherein the filter function is a linear function.

48. The method according to claim 45, wherein the filter function is a quadratic function.

49. The method according to claim 45, wherein the filter function is a sinc function.

50. The method according to claim 45, wherein said first image is a colour image.

51. The method according to claim 45, wherein said filter function is two-dimensional function.

52. An apparatus for performing interpolation on a pixel-based image, said apparatus comprising:
- input means for inputting dimension values corresponding to a first image and a second image:
- calculator means for calculating a first sampling increment value, a second sampling increment value, a first sampling limit value and a second sampling limit value, for said first image, using said dimension values;
- processor means for computing interpolation indicators for said second image according to said first and second sampling limit values, and for calculating filter function coefficients using said interpolation indicators and a filter function, wherein only those filter function coefficients required for said dimension values are calculated;

storage means for storing said filter function coefficients;

detection means for detecting incoming pixels of said first image;

coefficient access means for accessing said stored filter function coefficients; and an interpolator for performing interpolation on said pixels of said first image, using said accessed filter function coefficients, to generate said second image.

53. The apparatus according to claim 52, wherein the filter function is a cubic function.

54. The apparatus according to claim 52, wherein the filter function is a linear function.

55. The apparatus according to claim 52, wherein the filter function is a quadratic function.

56. The apparatus according to claim 52, wherein the filter function is a sinc function.

57. The apparatus according to claim 52, wherein said first image is a colour image.

58. The apparatus according to claim 52, wherein said filter function is two-dimensional function.

59. A computer readable medium storing a program for an apparatus which processes data, said processing comprising a method of performing interpolation on a pixel-based image, said program comprising:

code for inputting dimension values of a first image and a second image;

code for calculating a first sampling increment value, a second sampling increment value, a first sampling limit value and a second sampling limit value, for said first image, using said dimension values;

code for computing interpolation indicators for said second image according to said first and second sampling limit values;

code for calculating filter function coefficients using said interpolation indicators and a filter function, wherein only those filter function coefficients required for said dimension values are calculated;

code for storing said filter function coefficients;

code for detecting incoming pixels of said first image;

code for accessing said stored filter function coefficients; and code for performing interpolation on said pixels of said first image, using said accessed filter function coefficients, to generate said second image.

60. The computer readable medium according to claim 59, wherein the filter function is a cubic function.

61. The computer readable medium, according to claim 59, wherein the filter function is a linear function.

62. The computer readable medium according to claim 59, wherein the filter function is a quadratic function.

63. The computer readable medium according to claim 59, wherein the filter function is a sinc function.

64. The computer readable medium according to claim 59, wherein said first image is a colour image.

65. The computer readable medium according to claim 59, wherein said filter function is two-dimensional function.

66. A method of performing image interpolation, the method comprising the steps:

(i) inputting dimension values of a first image and a second image;

(ii) calculating a first sampling increment value, a second sampling increment value, a first sampling limit value and a second sampling limit value, for said first image, using said dimension values;

(iii) computing pairs of interpolation indicators according to said first and second sampling limit values;

(iv) calculating fractional first and second coordinate values using said interpolation indicators;

(v) calculating filter function coefficient values, based on said first and second fractional coordinate values, utilizing a filter function;

(vi) storing said filter function coefficient values in a table;

(vii) detecting input pixel values of said first image;

(viii) accessing said stored filter function coefficients; and (ix) performing image interpolation on said pixels of said first image using said stored filter function coefficient values to produce said second image.

67. An apparatus for performing image interpolation, the apparatus comprising:

input means for inputting dimension values of a first image and a second image;

calculator means for calculating a first sampling increment value, a second sampling increment value, a first sampling limit value and a second sampling limit value, for said first image, using said dimension values, computing pairs of interpolation indicators according to said first and second sampling limit values, calculating fractional first and second coordinate values using said interpolation indicators, and calculating filter function coefficient values, based on said first and second fractional coordinate values, utilizing a filter function;

storage means for storing said filter function coefficient values in a table;

detection means for detecting input pixel values of said first image;

coefficient access means for accessing said stored filter function coefficients; and an interpolator for performing image interpolation on said pixels of said first image using said stored filter function coefficient values to produce said second image.

68. A computer readable medium storing a program for an apparatus which processes data, said processing comprising a method of performing image interpolation, said program comprising:

code for inputting dimension values of a first image and a second image;

code for calculating a first sampling increment value, a second sampling increment value, a first sampling limit value and a second sampling limit value, for said first image, using said dimension values;

code for computing pairs of interpolation indicators according to said first and second sampling limit values;

code for calculating fractional first and second coordinate values using said interpolation indicators;

code for calculating filter function coefficient values, based on said first and second fractional coordinate values, utilizing a filter function;

code for storing said filter function coefficient values in a table;

detecting input pixel values of said first image;

code for accessing said stored filter function coefficients; and code for performing image interpolation on said pixels of said first image using said stored filter function coefficient values to produce said second image.

69. A method of performing interpolation on a first pixel-based image, the method comprising the steps of:
(i) inputting dimension values for said first pixel based image and a second image;
(ii) calculating a first sampling increment value, a second sampling increment value, a first sampling limit value and a second sampling limit value, for said first image, using said dimension values;
(iii) computing pairs of interpolation indicators according to said first and second sampling limit values;
(iv) calculating a plurality of filter function coefficients using said interpolation indicators;
(v) storing said filter function coefficients;
(vi) detecting incoming pixels of said first image;
(vii) accessing said stored filter function coefficients; and
(viii) performing interpolation on said pixels of said first image, using said accessed filter function coefficients, to generate said second image.

70. An apparatus for performing interpolation on a first pixel-based image, comprising:
calculator means for inputting dimension values for said first pixel-based image and a second image and for calculating a first sampling increment value, a second sampling increment value, a first sampling limit value and a second sampling limit value, for said first image, using said dimension values;
processor means for computing pairs of interpolation indicators according to said first and second sampling limit values and for calculating a plurality of filter function coefficients using said interpolation indicators;
storage means for storing said filter function coefficients;
detection means for detecting incoming pixels of said first image;
coefficient access means for accessing said stored filter function coefficients; and
an interpolator for performing interpolation on said pixels of said first image, using said accessed filter function, coefficients, to generate said second image.

71. A computer readable medium for storing a program for an apparatus which processes data, said processing comprising a method of performing interpolation on a first pixel-based image, said program comprising:
code for inputting dimension values for said first pixel-based image and a second image;
code for calculating a first sampling increment value, a second sampling increment value, a first sampling limit value and a second sampling limit value, for said first image, using said dimension values;
code for computing pairs of interpolation indicators according to said first and second sampling limit values;
code for calculating a plurality of filter function coefficients using said interpolation indicators;
code for storing said filter function coefficients;
code for detecting incoming pixels of said first image;
code for accessing said stored filter function coefficients; and
code for performing interpolation on said pixels of said first image, using said accessed filter function coefficients, to generate said second image.

* * * * *

UNITED STATES PATENT AND TRADEMARK OFFICE
CERTIFICATE OF CORRECTION

PATENT NO.     : 6,714,210 B1
DATED          : March 30, 2004
INVENTOR(S)    : Dominic Yip et al.

It is certified that error appears in the above-identified patent and that said Letters Patent is hereby corrected as shown below:

Title page,
Item [57], ABSTRACT,
Line 3, "said second" should read -- a second --.

Column 2,
Line 59, "function;" should read -- functions; --.

Column 3,
Line 30, "interpolator" should read -- an interpolator --; and
Line 55, "image:" should read -- image; --.

Column 4,
Line 23, "interpolator" should read -- an interpolator --.

Column 5,
Line 28, "interpolator" should read -- an interpolator --.

Column 6,
Line 8, "method comprising the steps of:" should read -- apparatus comprising: --; and
Line 18, "interpolator" should read -- an interpolator --.

Column 7,
Line 8, "are" should be deleted.

Column 8,
Line 31, "unit 3" should read -- unit 103 --;
Line 62, "LCU 3" should read -- LCU 103 --; and
Line 65, "count maxx," should read -- count $max_x$, --.

Column 9,
Line 19, "decrement or 407." should read -- decrementor 407. --;
Line 24, "to incremented" should read -- clocked and incremented --;
Line 30, "decrement" should read -- is decremented --;
Line 47, "(525, 527, 529)" should read -- (525, 527, 529), --;
Line 52, "since," should read -- sinc, --; and
Lines 66 and 67, "represent" should read -- represents --.

UNITED STATES PATENT AND TRADEMARK OFFICE
CERTIFICATE OF CORRECTION

PATENT NO. : 6,714,210 B1
DATED : March 30, 2004
INVENTOR(S) : Dominic Yip et al.

It is certified that error appears in the above-identified patent and that said Letters Patent is hereby corrected as shown below:

Column 10,
Line 1, "represent" should read -- represents --; and
Line 7, "system 1" should read -- system 101 --.

Column 11,
Line 39, "(7,1), )9,2)," should read -- (7,1), (9,2), --;
Line 44, "4/8,0)," should read -- (4/8,0), --; and
Line 53, "(1,1), (1,0)," should read -- (1,-1), (1,0), --.

Column 12,
Line 26, "first" should read -- the first --; and
Line 33, "index J" should read -- index I --.

Column 13,
Line 64, "coned" should read -- connected --.

Column 14,
Line 11, "FIG. 1." should read -- FIG. 11. --.

Column 16,
Line 40, "computer medium" should read -- computer readable medium --.

Column 17,
Line 46, "apparats" should read -- apparatus --.

Column 18,
Line 29, "arid" should read -- and --; and
Line 56, "two-dimensional" should read -- a two-dimensional --.

Column 19,
Lines 25 and 62, "two-dimensional" should read -- a two-dimensional --.

Column 21,
Line 6, "pixel based" should read -- pixel-based --.

UNITED STATES PATENT AND TRADEMARK OFFICE
CERTIFICATE OF CORRECTION

PATENT NO. : 6,714,210 B1
DATED : March 30, 2004
INVENTOR(S) : Dominic Yip et al.

It is certified that error appears in the above-identified patent and that said Letters Patent is hereby corrected as shown below:

Column 22,
Line 7, "function," should read -- function --; and
Line 10, "for" should be deleted.

Signed and Sealed this

Eighth Day of March, 2005

JON W. DUDAS
*Director of the United States Patent and Trademark Office*